US007747957B2

(12) United States Patent
Masuda

(10) Patent No.: US 7,747,957 B2
(45) Date of Patent: Jun. 29, 2010

(54) WORK SPACE CONTROL APPARATUS

(75) Inventor: Yoshihiro Masuda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 836 days.

(21) Appl. No.: 10/646,828

(22) Filed: Aug. 25, 2003

(65) Prior Publication Data
US 2004/0168172 A1 Aug. 26, 2004

(30) Foreign Application Priority Data
Feb. 24, 2003 (JP) ............................. 2003-046412

(51) Int. Cl.
G06F 3/00 (2006.01)
(52) U.S. Cl. ................... 715/753; 715/751; 715/784; 709/204; 709/205
(58) Field of Classification Search ......... 715/751–759, 715/784; 709/204, 205
See application file for complete search history.

(56) References Cited

U.S. PATENT DOCUMENTS

| 5,596,695 | A | * | 1/1997 | Hamada et al. | ............. 715/763 |
| 5,634,129 | A | * | 5/1997 | Dickinson | ................... 719/315 |
| 5,828,375 | A | * | 10/1998 | Nomura et al. | ............. 715/764 |
| 5,850,352 | A | * | 12/1998 | Moezzi et al. | ............. 345/419 |
| 5,999,208 | A | * | 12/1999 | McNerney et al. | ....... 348/14.08 |
| 6,029,171 | A | * | 2/2000 | Smiga et al. | ................ 707/102 |
| 6,119,147 | A | * | 9/2000 | Toomey et al. | .............. 709/204 |
| 6,583,808 | B2 | * | 6/2003 | Boulanger et al. | ....... 348/14.09 |
| 6,725,454 | B1 | * | 4/2004 | Nagel et al. | .................. 718/100 |
| 6,812,923 | B2 | * | 11/2004 | Gosalia et al. | .............. 345/419 |
| 6,938,258 | B1 | * | 8/2005 | Weinberger et al. | ......... 719/312 |
| 7,171,448 | B1 | * | 1/2007 | Danielsen et al. | ........... 709/205 |
| 7,213,051 | B2 | * | 5/2007 | Zhu et al. | .................... 709/205 |
| 2001/0051984 | A1 | * | 12/2001 | Fukasawa | .................... 709/205 |
| 2003/0102974 | A1 | * | 6/2003 | Allen | ...................... 340/686.6 |
| 2003/0110067 | A1 | * | 6/2003 | Miller et al. | .................... 705/8 |
| 2003/0167281 | A1 | * | 9/2003 | Cohen et al. | ............ 707/103 R |

FOREIGN PATENT DOCUMENTS

| JP | A-07-253843 | 10/1995 |
| JP | A 11-39320 | 2/1999 |
| JP | A-11-134225 | 5/1999 |
| JP | A 2000-259607 | 9/2000 |

(Continued)

OTHER PUBLICATIONS

Schafer et al., "Virtual Storytelling of Cooperative activities in a Theatre of Work", pp. 191-200, 2001.*

(Continued)

Primary Examiner—Weilun Lo
Assistant Examiner—Tuyetlien T Tran
(74) Attorney, Agent, or Firm—Oliff & Berridge, PLC

(57) ABSTRACT

When an activity event conducted by user object in the work space is detected by the detection server according to the detection of the activity event ID tag, the activity event is saved for each object by the work space server and the individual activity history server while the activity event can be referred. When the thus saved activity event is traced referring to the other objects, the computer for displaying an overview can display the saved activity event by the display of the object.

17 Claims, 19 Drawing Sheets

INTERFACE FOR DISPLAYING AN OVERVIEW

FOREIGN PATENT DOCUMENTS

| | | |
|---|---|---|
| JP | A 2001-84206 | 3/2001 |
| JP | A 2001-184397 | 7/2001 |
| JP | A-2002-008042 | 1/2002 |

OTHER PUBLICATIONS

Broil et al, "Symbolic Avatar Acting in Shared Virtual Environements", Jun. 17, 2002, pp. 1-9.*

Sakakibara et al., "Message Communication Built in Media Space for Distributed Workers".

Dourish et al., "Portholes: Supporting Awareness in a Distributed Work Group", CHI '92, May 3-7, 1992.

Steinfield et al., "Supporting Virtual Team Collaboration: The TeamSCOPE System".

Kikuta, Y. and Iwaihara, M. "Optimizing Object Presentation for Collaborative Work Considering User's Requests," Jul. 23, 2999, p. 249-254, vol. 99, No. 61. The Special Interest Group Notes of Information Processing Society of Japan, The Information Processing Society of Japan, Japan.

Okada, A., Tarumi, H., and Kambayashi, Y. "Development of an Activity Recording Model for Flexible Reuse in Collaborative Work." May 25, 2001, p. 59-64, vol. 2001, No. 48, The Special Interest Group Notes of Information Processing Society of Japan, The Information Processing Society of Japan, Japan.

* cited by examiner

DATA STRUCTURE OF OBJECT DETECTION EVENT

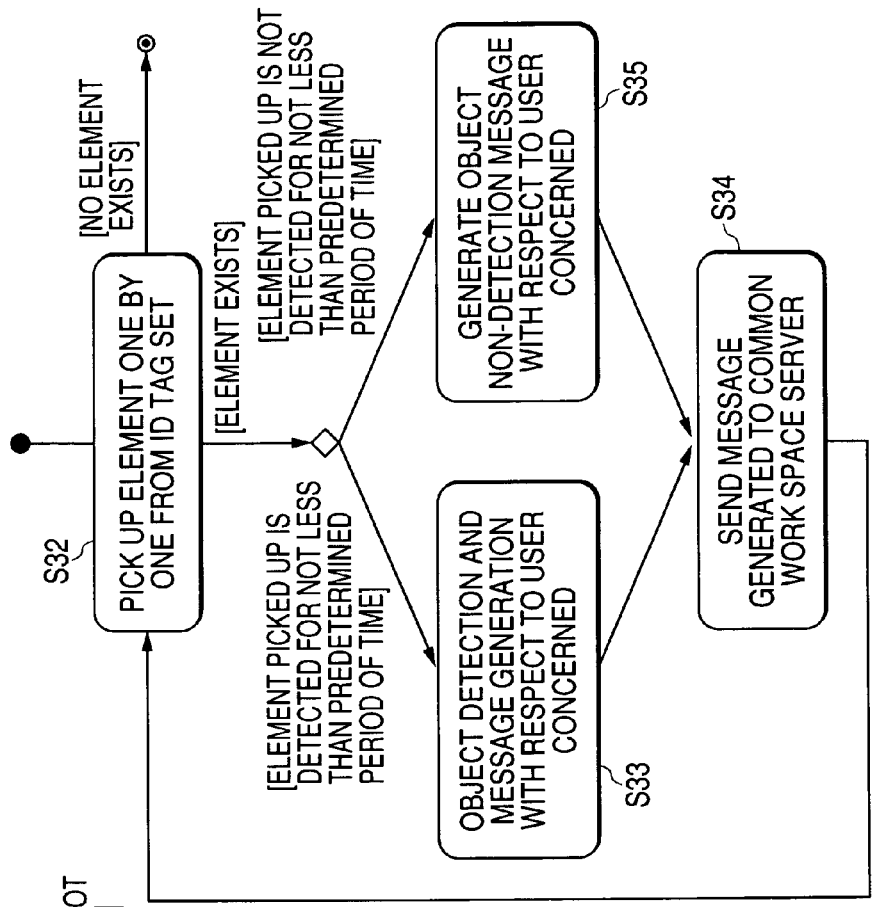
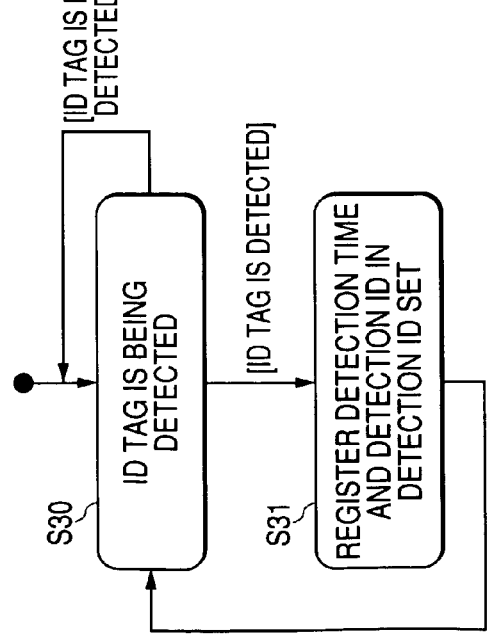

FIG. 4A

OBJECT DETECTION MESSAGE

```
<?xml version="1.0" encoding="Shift-JIS" ?>
<sensedinfo>
    <messageid>13C57A9B11D1E3</messageid>
    <status>detected</status>
    <objectid>2A4A6D81CB012</objectid>
    <datetime>10:23:15 July, 20, 2002</datetime>
    <tagreaderid>5B10A1CF5D20</tagreaderid>
</sensedinfo>
```

FIG. 4B

OBJECT NON-DETECTION MESSAGE

```
<?xml version="1.0" encoding="Shift-JIS" ?>
<sensedinfo>
    <messageid>1A35D791F1A13</messageid>
    <status>disappeared</status>
    <objectid>24A68DB1F01E2</objectid>
    <datetime>10:23:15 July, 20, 2002</datetime>
    <tagreaderid>5C1D0BA1E52B0</tagreaderid>
</sensedinfo>
```

DATA STRUCTURE OF COLLABORATIVE ACTIVITY CONTEXT

DETECTION OF OBJECT AND SENDING
OF OBJECT DETECTION MESSAGE

DETECTION OF OBJECT AND SENDING
OF OBJECT DETECTION MESSAGE

REPRODUCE AND VIEW CAPTURE IMAGE

PROCESSING OF GENERATION OF OBJECT CONTEXT CHANGE EVENT

DATA STRUCTURE OF COLLABORATIVE ACTIVITY OBJECT

FIG. 10A

ACTIVITY EVENT REGISTRATION MESSAGE

101

```
<?xml version="1.0" encoding="Shift-JIS" ?>
<activityevent>
    <messageid>2A1D3C4B6C5</messageid>
    <status>appeared</status>
    <credential>67F1B3E7A9D</credential>
    <objectid>24A6C8D1E01A2</objectid>
   <objecttype>person</objecttype>
    <datetime>15:32:05 July, 20, 2002</datetime>
    <workspaceid>97A5CA3FD2B6</workspaceid>
    <workspacename>CONFERENCE ROOM 21</workspacename>
    <previous>http://www.alpha.net/3D2A4356BC36B.xml</previous>
</activityevent>
```

FIG. 10B

ACTIVITY EVENT REGISTRATION MESSAGE

102

```
<?xml version="1.0" encoding="Shift-JIS" ?>
<activityevent>
    <messageid>2A1D3C4B6C5</messageid>
    <status>disappeared</status>
    <credential>67F1B3E7A9D</credential>
    <objectid>24A6C8D1E01A2</objectid>
   <objecttype>person</objecttype>
    <datetime>15:32:05 July, 20, 2002</datetime>
    <workspaceid>97A5CA3FD2B6</workspaceid>
    <workspacename>CONFERENCE ROOM 21</workspacename>
    <previous>http://www.alpha.net/3D2A4356BC36B.xml</previous>
</activityevent>
```

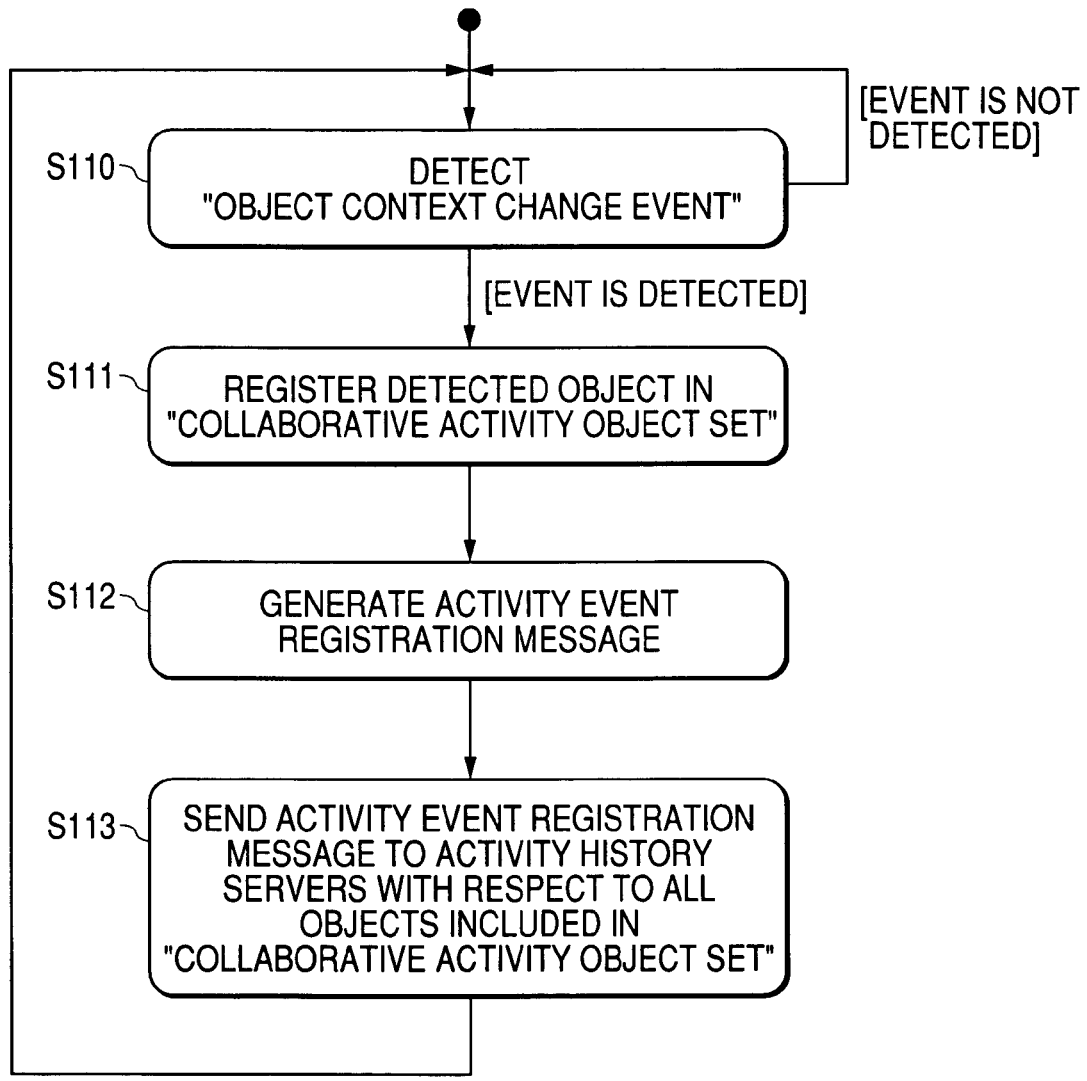

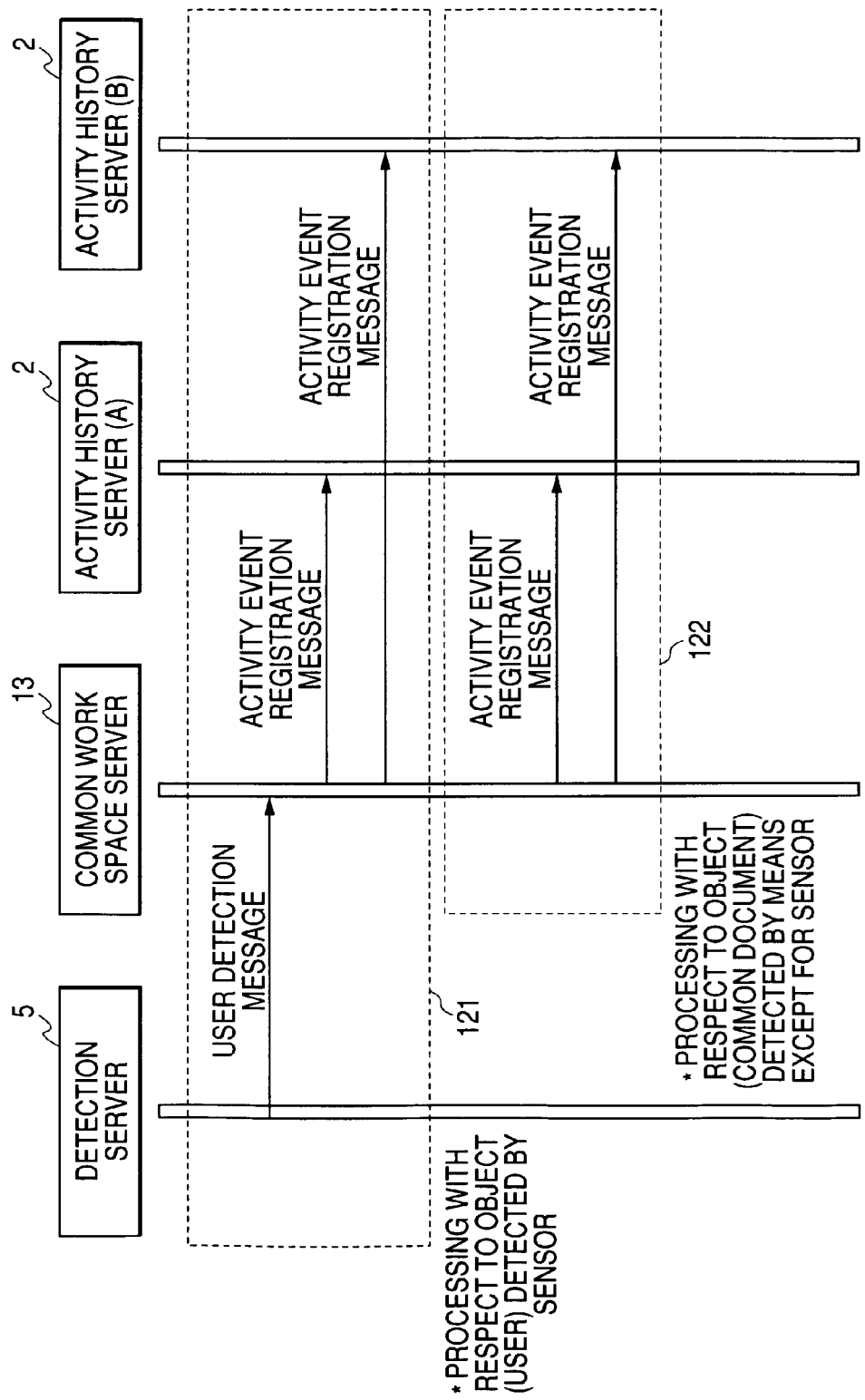

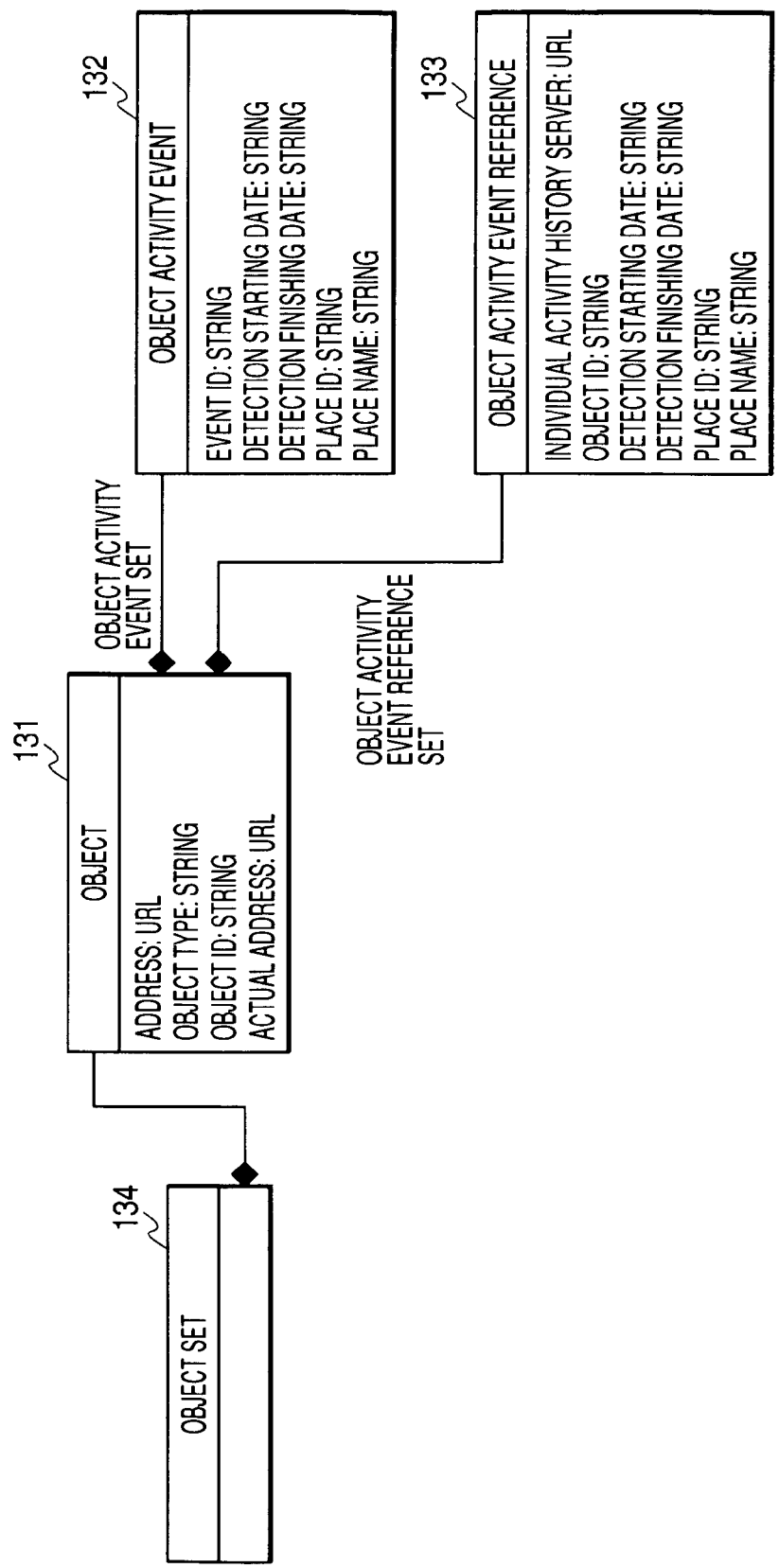

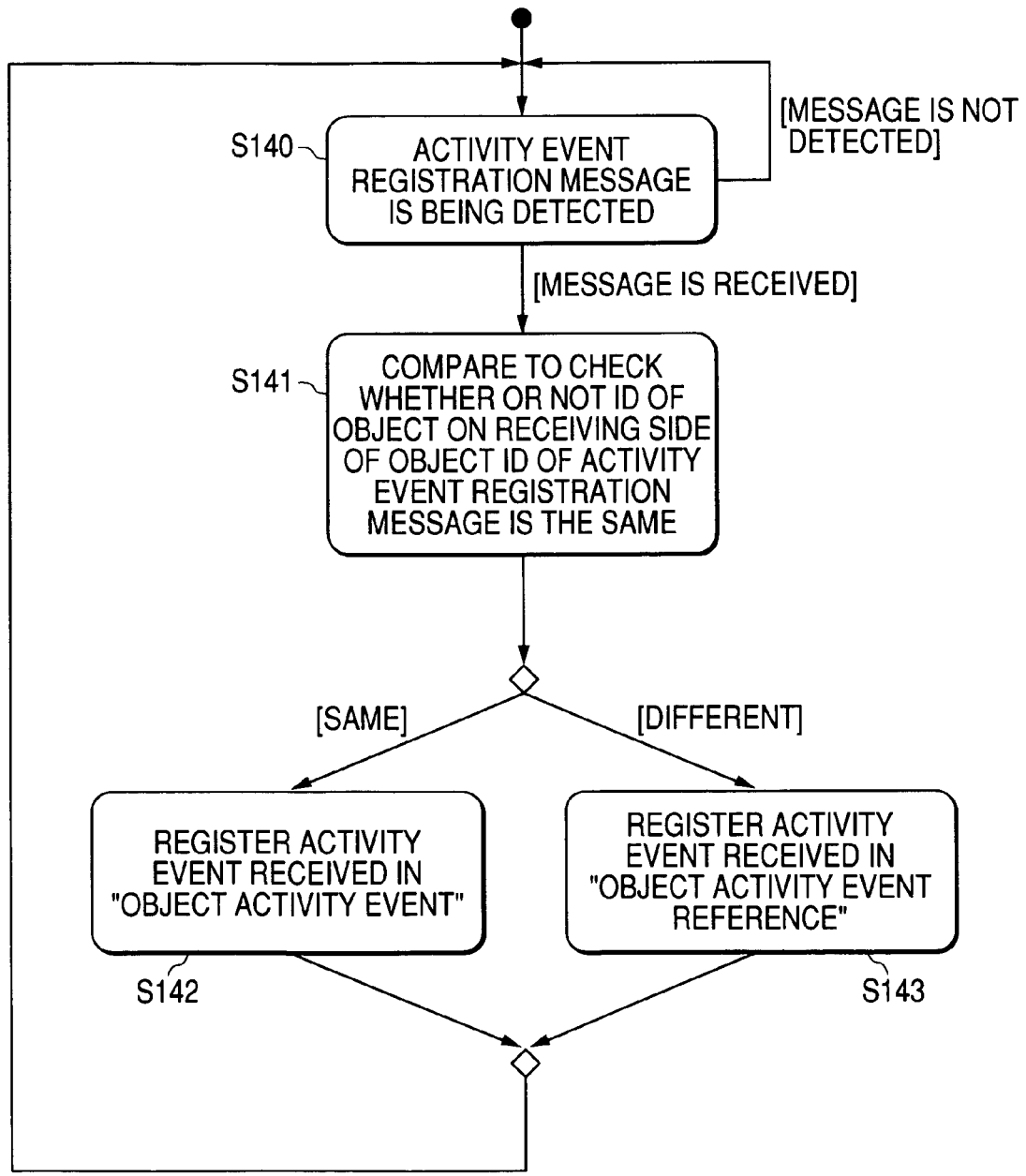

RELATION MATRIX BETWEEN OBJECTS

|          | OBJECT 1 | OBJECT 2 | OBJECT 3 |     | OBJECT n |
|----------|----------|----------|----------|-----|----------|
| OBJECT 1 | 0        | 0.12     | 0.45     |     | 0.02     |
| OBJECT 2 |          | 0        | 0.11     |     | 0.04     |
| OBJECT 3 |          |          | 0        |     | 0.22     |
| OBJECT 4 |          |          |          |     | 0.45     |
| OBJECT n |          |          |          |     | 0        |

151

DATA STRUCTURE OF RELATION HISTORY BETWEEN OBJECTS

161
RELATION HISTORY SET BETWEEN OBJECTS

RELATION SET BETWEEN OBJECTS

162
RELATION BETWEEN OBJECTS
DATE: STRING
RELATION BETWEEN OBJECTS: FLOAT[][]

INTERFACE FOR DISPLAYING AN OVERVIEW

INTERFACE FOR DISPLAYING AN OVERVIEW OF ACTIVITY HISTORY

FIG. 19

VIEW OF COMMON DOCUMENT

BASIC DESIGN DOCUMENT

BASIC DESIGN DOCUMENT

FIRST EDITION

DATE : AUGUST 1, 2002

PROCESSING OF GENERATION OF COLLABORATIVE ACTIVITY CONTEXT

AWARENESS OF CONTEXTS ACCORDING TO
RELATION BETWEEN OBJECTS DETECTED

WORK SPACE CONTROL APPARATUS

BACKGROUND OF THE INVENTION

The present invention relates to a technique of controlling a collaborative work activity conducted in a work space by a plurality of user objects so that the collaborative work activity can be displayed and utilized. For example, the present invention relates to a technique of automatically recording the contexts of communication and the document objects used in an activity and supporting the reuse of the thus recorded information so that the users can grasp the mutual contexts.

Concerning the technique of grasping the mutual contexts of work between users who are working at physically distant places from each other, there is proposed a method in which an image of the work space is monitored in real time by the workers working at physically distant places from each other, as disclosed in "P. Dourish, S. Bly; Portholes: Supporting Awareness in a Distributed Work Group, ACMCHI' 92, 1922" and "Sakakibara, Tadokoro, Miyazaki, Kato: Mounting of Message Communication Function in Media Space for Dispersed Workers, Workshop of Group Ware of Information Processing Society Vol. 40-3, 2001".

Further, there is proposed a method of providing various types of awareness such as availability (whether or not it is possible to use and make an access), process (progress of work), perspective (estimation of behavior of other users), environment (events occurring outside the activity) by the respective different user interfaces, as disclosed in "C. Stein Field, C. Y. Jang, B. Piaff, Supporting Virtual Team Collaboration: The Team SCOPE System, ACM GROUP 99, 1999".

There is also proposed a method in which major events are recorded in a time series by a simple operation of buttons in a collaborative work conducted at a site such as a site of disaster or a site of keeping guard on an event and the thus recorded information can be utilized by a plurality of users, as disclosed in JP-A-2001-184397.

There is also proposed a method in which the content of a collaborative work is recorded in addition to providing awareness of the state of work, and as a method of utilizing the content of the collaborative work for making access to information, the history of operation applied on the document is saved corresponding to the point of time so that retrieval can be made according to the editor, name of business and reference date. There is also proposed a method in which the history of document operation conducted on a desk-top is saved in a time series and a plurality of users grasp the state of the desk-top at an arbitrary point of time and make access to the document used at the point of time, as disclosed in JP-A-11-39320 and JP-A-2000-259607.

As a method of handling the history of making access to a document in an situation moving various actual work spaces, there is proposed a method in which the history of making access to a document is saved corresponding to the time and place and the thus saved history is displayed so as to make access to it, as disclosed in JP-A-2001-84206.

In any of the above method in which the activity can be grasped by users who are positioned at distant places from each other and the method in which access is made to an object according to the state of an activity stored in a time series, the state of an activity and the history of an activity adopt an architecture according to a centralized control which is previously prepared corresponding to the context of the group activity. Therefore, it is impossible to realize a function of saving the past history of an activity in common while exceeding the previously determined users and the frame of a collaborative work.

In the case of a task or project in which a plurality of members are active to accomplish a common object, in a working environment in which the members are working being dispersed at a plurality of positions which are distant from each other and further members are acting while moving in the offices, it is important that the members grasp the contexts of activities conducted by each member in real time and also it is important for the members to have a sense of togetherness while they are working. Even when the organization activities conducted in the past and the information contents such as documents, which were generated and referred in the other organization activities, are saved so that they can be utilized in common, it is important that the users can make access to them so that they can be effectively utilized according to the contexts.

A large number of methods have been proposed to solve the above problems, which will be described as follows. There is provided a system in which the members can give awareness to each other. Information contents such as documents, which were used in activities, are saved in a server and utilized again according to the contexts.

However, the main object of the conventional method is operation conducted on a document located on a desk-top. Therefore, the conventional method does not give consideration to a case in which an activity of collaborative work conducted in an actual work space, for example, a state in which a plurality of users have a document in the same work space in common is saved as the history of the activity and utilized again. It is one of the problems to be solved by the present invention that the history of an activity in the actual work space is recorded according to the actual working contexts.

Further, the conventional method has the following problems. According to the method of the prior art, the history of an activity is intensively controlled by one server prepared corresponding to a working group. Therefore, in an environment in which the members of the working group are frequently changed or the working group ceases to exist, the history of an activity, of the collaborative work conducted in the past can not be successively utilized.

SUMMARY OF THE INVENTION

To solve the above problem is an objective of the present invention, that is, according to the present invention, in order to cope with the above contexts, the history of an activity of the past collaborative work is successively utilized again without being affected by a change in the working group members or without being affected by an extinction of the working group.

The problems to be solved by the present invention (that is, the objective) can be clearly seen in the following explanations.

In order to accomplish the above object, the constitution of the present invention is described as follows. When an activity event conducted by an object in a work space is detected, the detected activity event is saved for each object of the activity event so that it can be referred by the other objects. When the thus saved activity event is traced while referring to the other objects, a plurality of the saved activity events can be displayed by the display of the object, and the activity conducted by the object in the work space is controlled as history, and the history of the activity is utilized again.

According to the present invention, when an activity event conducted by an object in a work space is detected, the detected activity event is saved for each object of the activity event in relation to the time and place of the activity, and the thus saved activity event is displayed by the display of the object. The activity conducted by the object in the work space is controlled as history and the history of the activity can be utilized again.

In the present invention, according to the activity event, the actual information of the object of the activity (the profile of the user object, the actual data of the document object and so forth) is acquired and outputted so that it can be displayed.

Further, according to the present invention, responding to the fact that access is made to the actual information of the object, a correspondence and warning are sent to the user object, that is, a predetermined processing operation can be started.

Further, according to the present invention, the detected activity event can be saved for each object of the activity event being accompanied by the information of the activity time while the detected activity event can be referred from the other objects.

Further, according to the present invention, the activity event can be displayed by the display of the object arranged by a positional relation based on the degree of relation between the objects.

Further, according to the present invention, the captured data of the activity in the work space is taken, and the captured data is controlled in relation to the activity event, and this captured data can be outputted and displayed in relation to the activity event.

Further, according to the present invention, a change in a set of the user objects in the activity event is detected. Each time the change is detected, the activity is saved as a different activity event, so that the individual activity event is automatically accumulated as the history.

Further, according to the present invention, concerning the activity, when a predetermined state is detected, a warning can be outputted to the user object.

Further, according to the present invention, processing of detecting an activity event conducted by an object in a work space, processing of saving a detected activity event for each work space of the activity event, processing of saving an activity event for each object of the activity event corresponding to the detection of the activity event while the activity event can be referred from the other object and processing of displaying a plurality of the saved activity events by the display of the object when the saved activity event is chased while referring to the other object can be realized by a different conventional device. Due to the foregoing, it is possible to realize the dispersion control of information. Therefore, the present invention can cope with an environment in which the members of a working group frequently change or the working group becomes extinct, and the activity history can be successively controlled.

The present invention can be realized as a work space control device and a work space control system. Further, the present invention can be realized as an each functional device composing the device concerned of the system, a program by which each functional device is realized by a computer and a work space control method.

According to the present invention, an activity event (a change in a position of a user in a room, a document or operation of software and so forth) of each object in a common work space in an actual world is detected, and the thus detected activity event in the common work space is saved in the context prepared corresponding to the object while the activity event can be referred from the other objects, and a relation of various object groups, which is acquired by tracing the saved activity events, can be displayed.

Due to the foregoing, contexts of an activity (a used place and time, and the other objects used in the case of a collaborative work), in which objects such as a user, electronic contents used by the user and application program use by the user are active, are recorded as the activity history in a time series, and a relation between the recorded objects is displayed on a display interface. Therefore, a plurality of users can mutually grasp the activity contexts.

The actual information of an object can be picked up by the clue of the activity history. Due to the foregoing, various information sources accommodated by the conventional system published on the network can be utilized in relation to the activity while a memory region for accumulating various information sources is being utilized as it is without ensuring a new memory region.

When the detected activity is saved in a time series in relation to the time, an overview of contexts at an arbitrary point of the time in the past can be displayed, and the individual object can be picked up.

A relation between the objects in the activity contexts is displayed being arranged as a positional relation according to the degree of the relation between the objects. When a user designates an object on the display, the actual information of the object can be picked up. Due to the foregoing, the user can intuitively grasp the contexts and make access to the object.

According to the activity history of a collaborative work conducted in the past between the user and the other user, an intensity of the relation with the other user is calculated, and an overview of a relation between the objects can be displayed according to the intensity. Due to the foregoing, without clearly designating a user group, an activity community as a user group is automatically guided out, and the community members can have awareness and information in common.

According to the activity history of a collaborative work conducted among a plurality of users in the past, an intensity of the relation among the objects is calculated, and an overview of the relation can be displayed. Due to the foregoing, it becomes easy for the individual users to attach importance to his own activity and intuitively grasp a relation with the other objects.

Further, when a recorded image and voice of conversation conducted in a conference room are picked up and played back later, it becomes possible to call the remembrance, and further it becomes possible to let users, who could not join the conversation, know the contents of the conversation.

Further, the user can designate processing to be started when access is made to an object. When the actual object is selected, the corresponding motion can be started. Due to the foregoing, when access is made to a user, a phone call can be automatically made to the user, and software for making notes to a document can be automatically started.

When some activity contexts are detected, processing to be started can be designated. When the designated activity contexts are detected, a warning message can be outputted to the user. Due to the foregoing, it is possible to give awareness to the contexts in which a large number of people get together in a meeting. It is also possible to give awareness to the contexts in which conversation is made for a certain topic.

Consequently, according to the present invention, for each object (a user, device, document and software), devices are respectively arranged which can remember a place and time, in which the object concerned is active, in a time series and also remember a relation with the other objects utilized in a collaborative work in the same work space. It is possible to openly make access to the remembrance of each object on the network. When a relation between the respective objects is traced on the network, it is possible to display the history of the collaborative work. Therefore, it is possible to control the collaborative work activity history composed of the activity history for each project on a decentralized open frame work connected by the peer-to-peer type connection. Due to the foregoing, conventionally, the corporate memory is intensively controlled as a record belonging to the organization (group or project), however, the corporate memory is realized as a memory belonging to the individual object. Therefore, even when the organization is changed or the active member is changed, operation can flexibly cope with the situation.

When the contexts of the related users and the related contents in the periphery are displayed in real time according to an intensity between the users acquired from the activity history of the collaborative work conducted between users, awareness can be given to each other by the members conducting the collaborative work. When the overview display is utilized, access can be made to various objects such as documents and users utilized in the past activity context. Due to the foregoing, in the case where a plurality of users positioned at distant positions from each other are working together, the members can give awareness to each other and support the formation of the community. In other words, an interface to give social awareness and an interface to make access to the activity record can be harmonized.

In this case, the concept of the work space in the present invention includes not only a space such as a conference room, which is prepared for working, but also a space in which a plurality of user objects can conduct some collaborative work (including the exchange of information). For example, a conversation, which is conducted by users who have suddenly come across to each other in a hallway referring to a commonly used document, can be reproduced by the history control of the present invention. In this connection, in this embodiment, a detection means and an activity event control means may be provided at a position such as a hallway where a collaborative work is possibly conducted.

BRIEF DESCRIPTION OF THE DRAWINGS

These and other objects and advantages of this invention will become more fully apparent from the following detailed description taken with the accompanying drawings in which:

FIGS. 3A and 3B is a view for explaining object detection and processing of sending a detection message of an embodiment of the present invention;

FIGS. 4A and 4B are views for explaining an object detection message of an embodiment of the present invention;

FIGS. 10A and 10B are views for explaining an activity event registration message of an embodiment of the present invention;

FIG. 11 is a view for explaining notification processing of an activity event of an embodiment of the present invention;

FIG. 12 is a view for explaining message exchange in transmission of an activity event of an embodiment of the present invention;

FIG. 13 is a view for explaining object history data of an embodiment of the present invention;

FIG. 14 is a view for explaining processing of message receiving registration of an activity event of an embodiment of the present invention;

FIG. 19 is a view for showing an example of displaying an image plane of an embodiment of the present invention;

DETAILED DESCRIPTION OF THE PREFERRED EMBODIMENTS

Figure 1:
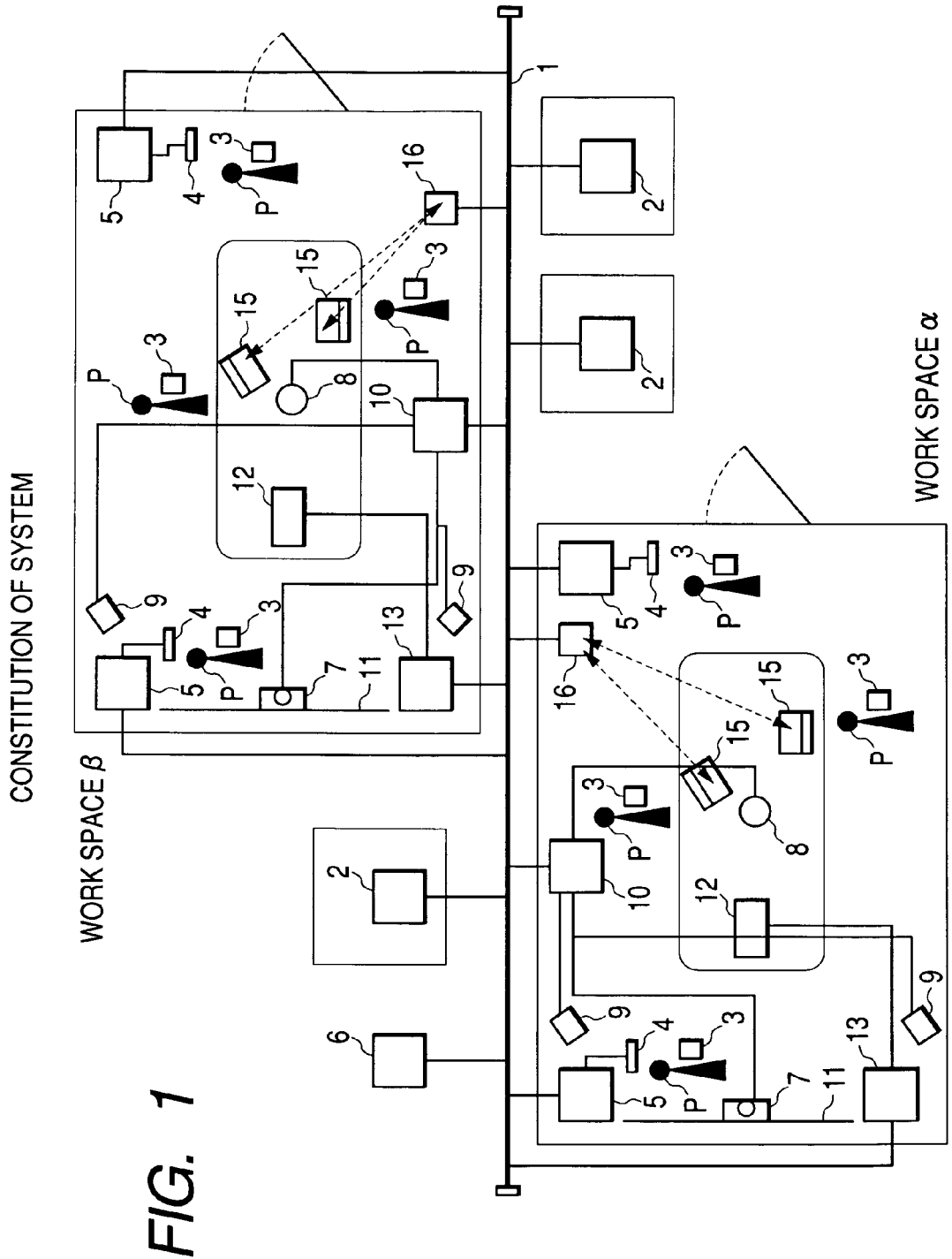
FIG. 1 is an: arrangement view for showing a work space control system of an embodiment of the present invention.
Figure 2:
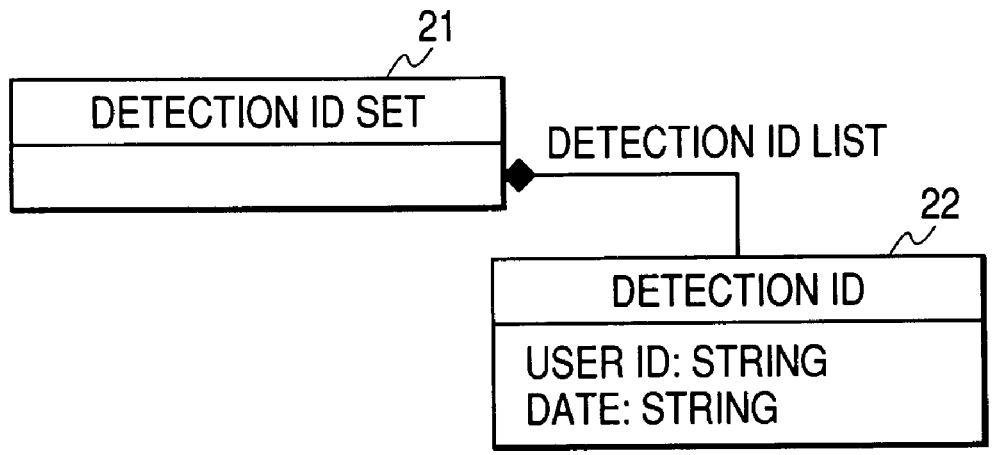
FIG. 2 is a view for explaining data of object detection events of an embodiment of the present invention.

An embodiment of the present invention will be specifically explained below. This embodiment provides an example in which user's activities are recorded in two work spaces α and β which are located at distant places from each other being connected by a network. This embodiment also provides an example in which an environment is provided so that a plurality of users can give awareness with respect to the activity contexts to each other.

In this connection, in this embodiment, the object is defined as a user, a document content of the individual user or an element such as a document content, which a plurality of users have in common, composing a collaborative work such as a conference. Further, the object is defined as a captured data such as recorded images of a conference.

In this embodiment, the work space control apparatus of the present invention includes: a detection server and detection means for controlling the detection of an object in a work space; a collaborative work space server for controlling the activity history for each work space; an individual activity history server for controlling the activity history for each user object; a common document server for controlling the activity history for each common document object; and a capture server for controlling the activity history for each capture object. The above functional devices composing the work space control apparatus may be entirely assembled. Alternatively, the above functional devices may be partially assembled.

In this connection, in this embodiment, the above functional devices function when a computer executes a predetermined program.

"Constitution of the System"

To each user P, the individual activity history server 2, which is connected to the network 1, is allotted. Each individual activity history server 2 has a function of saving and controlling the activity history (shown in FIG. 13) with respect to an object relating to each user P and a function of saving information contents owned by each user P.

In this connection, the information contents owned by each user P may be saved by the portable computer 15 of the user concerned and the data server.

In the work spaces α and β, there are provided RFID tag 3 carried by the user P and RFID tag reader 4 for recognizing the user P and detecting the existence of the user P in the work space concerned. RFID tag reader 4 is connected to the context detection server 5 connected to the network 1. When ID tag 3 of the user P is detected, the context detection server 5 notifies the individual activity history server 2 of the information such as the place and time of the detected user via the network 1 according to the ID information.

There is provided a common document server 6 connected to the network 1. The common document server 6 has a function of saving information contents such as electronic documents commonly owned by a plurality of users P and a function of saving the activity history with respect to the information contents.

In the work spaces α and β, there are provided a video camera 7, microphone 8 and speaker 9 to capture the collaborative activity such as a conference held at the place. Images and voices captured by these devices are sent to the server 10 for capture having a function of saving and controlling the activity history with respect to the capture.

In the work spaces α and β, there are provided a large-scale screen 11 and projector 12 for displaying the documents used in the collaborative work.

In the work spaces α and β, there is provided a common work space server 13 connected to the network 1. The common work space server 13 includes: a function of picking up document information to be projected onto the large-scale screen 11 from the individual activity history server 2 and the common document server 6; a function of transferring an event showing that the displayed document is owned in common to the individual activity history server 2 of the user P participating in the collaborative work; and a function of issuing an credential (a permit to permit making access) with respect to the document owned in common.

The individual user P uses a portable type computer 15 for displaying an overview which has a function of displaying the activity history relating to the activity of each user on the image plane and also has a function of starting a function which is made to correspond when access is made to an object or when the contexts are detected. This computer 15 for displaying an overview is connected to the network 1 via the wireless base station 16.

In this case, RFID tag reader 4 and the detection server 5 compose a detection means for detecting an activity event conducted by the object in the work space. There is provided an activity event control means for saving an activity event detected by the individual activity history server 2, common document server 6, capture server 10 and common work space server 13 for each activity event object capable of being referred from the other objects. There is provided an activity event display means for displaying a plurality of activity events saved being traced while referring to the other objects saved by the functions of these servers and the computer 15 for displaying an overview.

In this connection, the detail of the functions of the individual activity history server 2, detection server 5, common document server 6, capture server 10 and common space server 13 will be explained together with the motions of the components.

"Detection of user in Common Work space and Registration of Activity Event"

When the user P carrying the portable computer 15 enters the work space α, RFID tag 3 carried by the user (or RFID tag stuck to the portable computer) is detected by the RFID tag reader 4 arranged in the room. As shown in FIG. 3A, the context detection server 5 monitors RFID tag 3 at all times (step 30). Each time RFID tag 3 is detected by RFID tag reader 4, with respect to the new ID, the detected ID and "detection ID" 22 including the date and time of detection are generated. The thus generated "detection ID" 22 is registered in "detection ID set" 21 (step S31). On the other hand, concerning the existing ID, the detection data and time of the corresponding "detection ID" 22 registered in "detection ID set" 21 are renewed (step S31).

Further, the context detection server 5 conducts the processing shown in FIG. 3B at all times, and the detection date and time of "detection ID" 22 registered in "detection ID set" 21 are referred (step S32). In the case where the existence of the ID tag is detected for a predetermined period of time, in order to notify that the existence of an object corresponding to the ID tag concerned in the work space α has been recognized, the object detection message 41 for new registration described by XML form as shown in FIG. 4A is generated (step S33). The message concerned is sent to the common work space server 13, which is prepared corresponding to the work space α, as POST message of HTTP protocol (step S34). Accordingly, the common work space server 13 controls the existence (activity) of the object detected in the work space, which is in charge of the common work space server 13, at all times.

In this connection, an address of the common space server 13, to which the message is sent, is previously registered and set in the context detection server 5.

The object detection message 41 sent by the context detection server 5 includes: an element <messageid> which is a message identifier; an element <status> expressing a detection state; an element <objectid> which is an identifier of the detected object; an element <datetime> expressing a detected date and time; and an element <tagreaderid> which is an identifier of the detected tag reader. In order to notify that a new object has been detected, "detected" is set as a value of the element <status>.

"Processing of Withdrawal of User from Work Space"

When the user P withdraws from the work space α, RFID tag 3 carried by the user P (or RFID tag stuck on the portable type computer) can not be detected by RFID tag reader 4 arranged in the room.

The context detection server 5 refers to "detection ID set" 21 (step S32). In the case where RFID tag 3 can not be detected for not less than a predetermined period of time, in order to notify that ID concerned has become invalid as an element composing the work space α, the object non-detection message 42 used for erasing the registration is generated (step S35). The message concerned is sent to the common work space server 13, which is prepared corresponding to the work space α, in the same manner as that described above (step S34).

The object non-detection message 42 sent by the context detection server 5 includes: an element <messageid> which is a identifier of the message; an element <status> expressing a detection state; an element <objectid> which is an identifier of the object not detected; an element <datetime> expressing a date and time at the point of time when no detection is conducted; and an element <tagreaderid> which is an identifier of the tag reader. In order to notify that the object has not been detected, "disappeared" is set as a value of an element <status>.

"Detection of Appearance of Common Information in Common Work Space and Registration of Activity Event"

In the case where a document is accommodated in and acquired by a folder in the common document server 6, the following processing is conducted.

Figure 5:
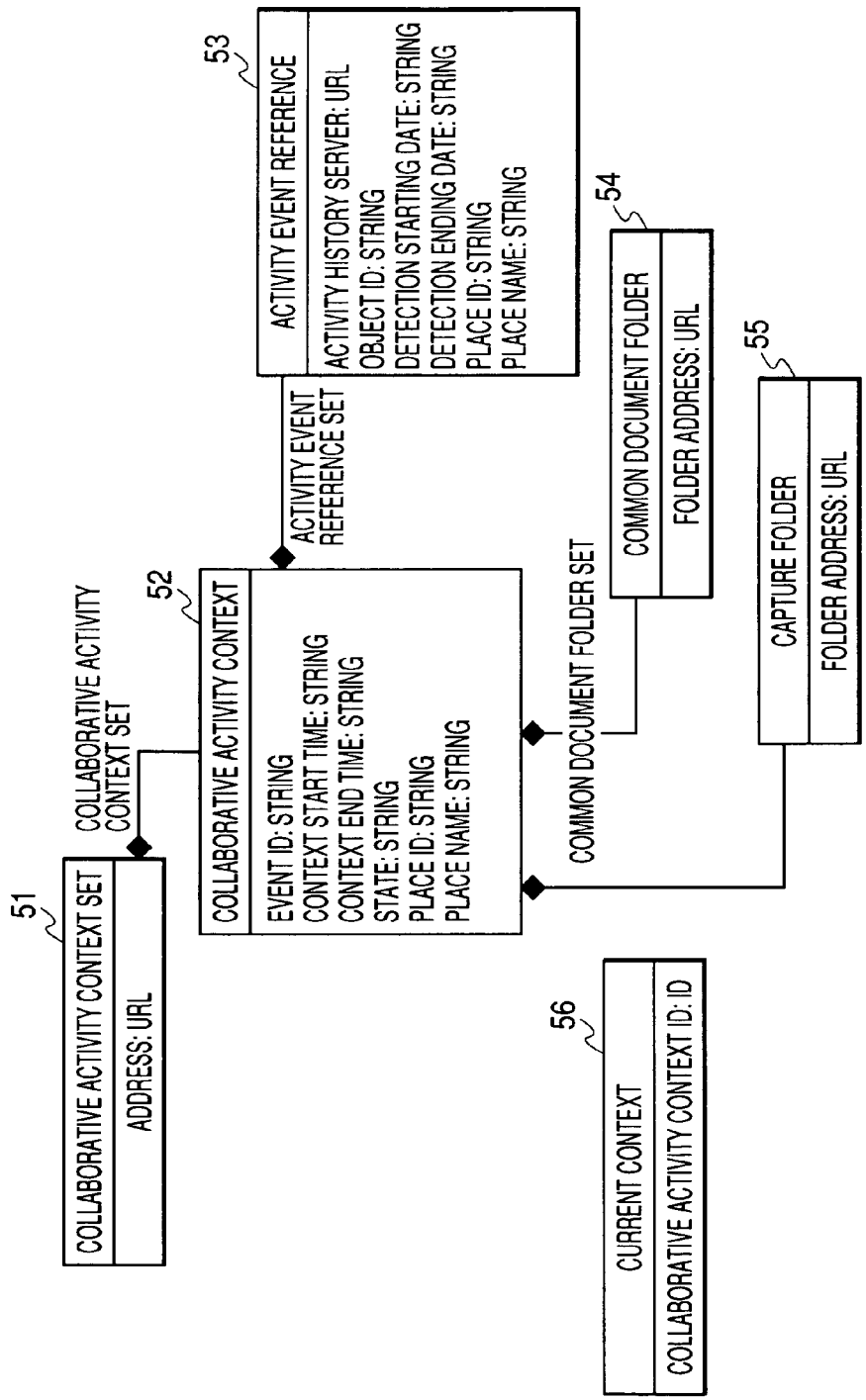
FIG. 5 is a view for explaining collaborative activity context data of an embodiment of the present invention.

In the case where access is made to a folder in the common document server 6 for saving the information contents (document file, reference URL and so forth) commonly owned in the process of conducting a collaborative work such as a presentation and argument in the work space, by the common work space server 13 itself or the portable computer 15 via the collaborative work space server 13 corresponding to the work space, in the common space server 13, "the common document folder" 54 containing the address URL with respect to the folder shown in FIG. 5 is generated and added to the common document folder set of "the collaborative work context" 52.

"The collaborative activity context" shown in FIG. 5 is data saved and controlled by the common work space sever 13 provided in each work space. "The collaborative activity context" 52 shown in FIG. 5 saves the history of the collaborative activity conducted in the work space. The collaborative activity context saves "the set" 51 in which the individual conferences are made to be "the collaborative activity context" 52. The collaborative activity context saves and controls: a set of "activity event reference" 53 for saving and controlling a user participating in the collaborative activity while containing the address URL of the individual activity history server; a set of "the common document folder" 54 which specifies the common document used in the collaborative activity by the folder address URL of the common document server; and a set of "the capture folder" 55 which specifies the captured video in the collaborative activity by the folder address URL of the capture server.

The collaborative work conducted at present is made to correspond to "the collaborative activity context" 52 by ID as "the current context" 56. In other words, by "the collaborative work context set" 51 saved by the common work space server 13, concerning the collaborative activity such as a conference conducted in the work space concerned, it is successively saved and controlled as the individual history what time it was saved, who participated in the collaborative activity and what capture was made.

Figure 6A:
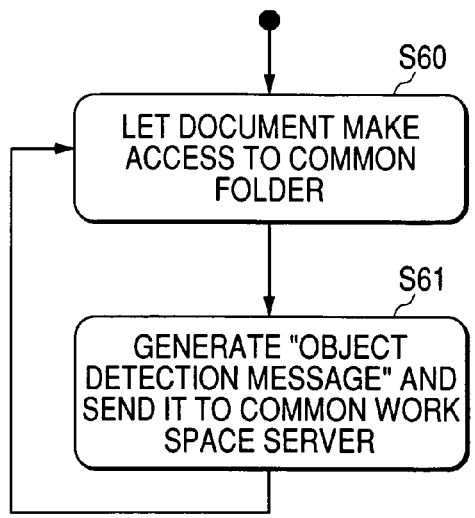
FIGS. 6A and 6B are views for explaining object detection and processing of sending a detection message of an embodiment of the present invention.

In order to generate the collaborative work context in the common work space server 13, as shown in FIG. 6A, the detection server 5 makes access to a folder in the common document server 6, which is registered in the common document folder set 55, via the common work space server 13 and the document is accommodated and acquired (step S60). Then, the object detection message 41 for notifying that the object has been newly generated in the current context is generated and sent to the common work space server 13 as POST message (step S61).

"Processing of Handling Capture Image of Conference as New Detection Object"

In the same manner as that described above, when recording of a conference image in the work space is started, an image signal and voice signal inputted from the camera 7 and the microphone 8 arranged in the work space a are transferred into digital signals via CODEC on the image and voice capture board, which is provided in the common work space, and taken in. These digital signals are converted into an image and voice compression format such as MPEG type and saved as "the object" 131 in the server 10 for capture being accompanied by the activity history.

As shown in FIG. 13, the object history data is: "the object" 133 which is information of each object such as a user and common document; "the object activity event" 132 which is the history of the collaborative activity in which the object participated and was used; and "the object set" 134 which includes "the other reference link to the object" 133 detected in the same collaborative activity (the same time and the same position) as the object concerned. The object history data of a user is saved in the individual activity history server 2 corresponding to the user, and the object history data of a common document is saved in the common document server 6 corresponding to the common document concerned, and the object history data of a capture is saved in the capture server 10 corresponding to the capture concerned.

By this object history data, with respect to the object concerned, the address URL and the actual address URL (in the case of a document) are controlled together with ID of the object. Further, with respect to the collaborative activity in which the object concerned participated or which was used, the date and time and place of the collaborative activity are controlled together with ID. Further, with respect to the other object (user) which participated in the collaborative activity concerned or which was used for the collaborative activity, the address URL of the individual activity history server 2 is controlled together with ID. Accordingly, for example, concerning a user, the history that the user attended a conference, the date, place and participants of which are known, is controlled, and the reference to the other participants can be made by the address URL of the individual activity history server 2.

As shown in FIG. 5, concerning the activities, the history of each activity is saved and controlled corresponding to the object which participated in the activity. As shown in FIG. 13, each object is saved and controlled in relation to the collaborative activity and also in relation to the other objects in relation to the collaborative activity concerned. Since each object is saved and controlled in relation to the control data as described above, each activity event is saved while the activity event can be referred from the other objects. Further, in the overview display processing described later, when the activity and the object are traced in relation to the control data, a plurality of the activity events can be displayed by the display of the object by the form of a time series.

Figure 6B:
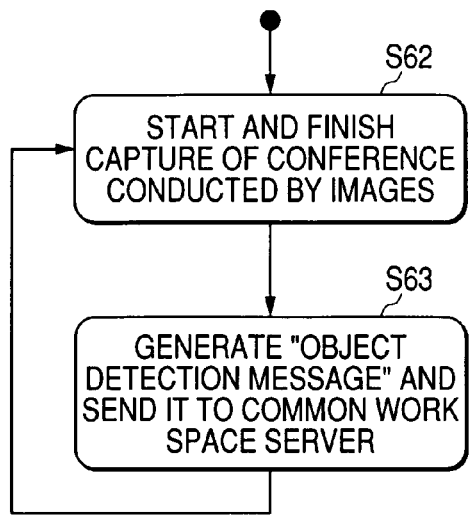

Further, as shown in FIG. 6B, in the same manner as that of the individual activity history server 2, when the recording of an image is started (step S62), the capture server 10 generates an object detection message 41 for notifying that a new object has been detected, and sends the object detection message 41 to the collaborative work space server 13 corresponding to POST message (step S63). In the case where the capture has been finished the object non-detection message 42 for notifying that the capture image has not been detected is generated and sent to the corresponding common work space server 13.

Figure 7:
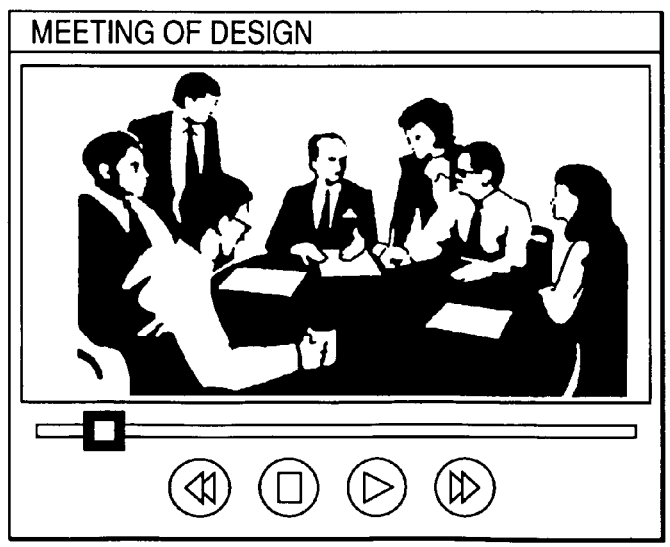
FIG. 7 is a view for showing an example of displaying an image plane of an embodiment of the present invention.

Accordingly, each time the image is captured, information with respect to the capture is saved and controlled by the common work space server 13 of the work space. In this connection, for example, as shown in FIG. 7, the captured image is reproduced and displayed on a computer image plane used by the user so that it can be used as a reference of the conference held in the past.

"Generation and Registration of Activity Event According to Activity Event"

Figure 8:
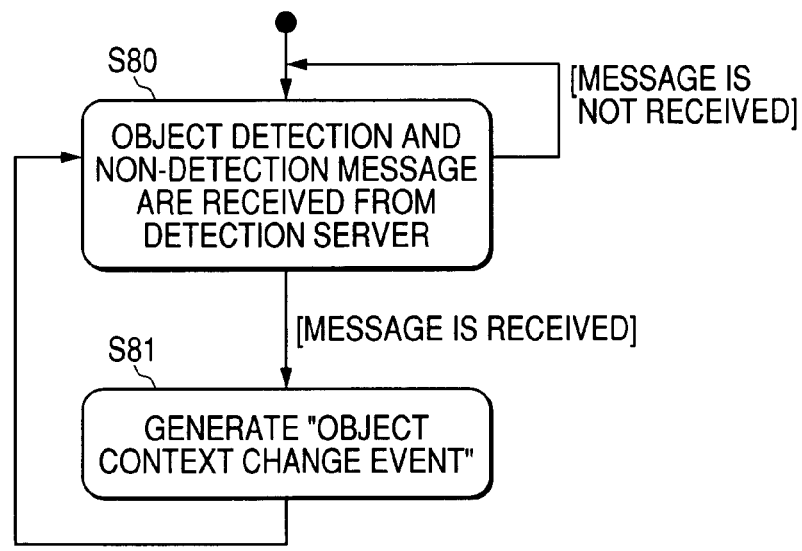
FIG. 8 is a view for explaining processing of generation of an object context change event of an embodiment of the present invention.

Processing conducted in the common work space server 13 in the case where a change in the object is detected under a context (a certain collaborative activity) is shown in FIG. 8.

The common work space server 13 receives an object detection message or non-detection message which has been sent as POST message (step S80). Then, the object context change event is generated (step S81).

Figure 9:
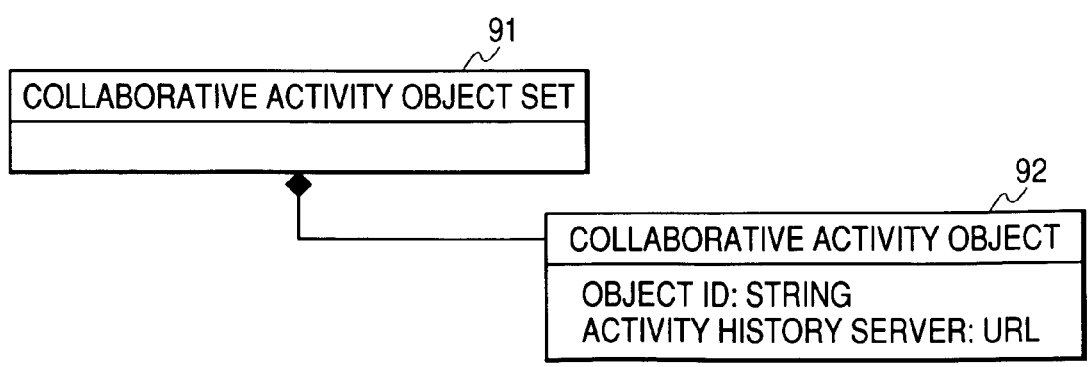
FIG. 9 is a view for explaining collaborative activity object data of an embodiment of the present invention.

As shown in FIG. 9, when the above object context change event is detected, the common work space server 13 generates "the collaborative activity object" 92 which is composed of the object ID detected and the activity history server URL for controlling the object activity history and registers it in "the collaborative activity object set" 91.

In this case, "the collaborative activity object set" 91 and "the collaborative activity object" 92 are saved by the common work space server 13 corresponding to the individual common work space, and ID of all objects existing in the work space concerned and the address URL of the actual body (a user profile, document and so forth) are registered. In this connection, concerning the object such as a capture image not belonging to the individual, data including ID and URL corresponding to it is generated and registered.

Next, according to the object context change event detected above, in order to have the activity event, which is generated in the common work space α, in common among the other objects existing in the same work space α, the common work space server 13 generates the activity event registration message 101 of the XML type shown in FIG. 10A.

The activity event registration message 101 is a message for asking the setting of the reference link for the activity event with respect to the notified object to all objects (the server controlling them) which are under the same contexts (the contexts in which they are existing at the same time in the same work space) The message includes: an element <messageid> representing a serial number of the message; an element <statusd> representing a new registration; a setting of "appeared" as a value; an element <objected> as an identifier of the object; an element <datetime> representing the registration date; an element <workpiece> which is an identifier of the place where the object exists at present; and an element <workspacename> representing the name of the place. In this connection, FIG. 10B is a registration message 102 for erasing the activity event.

Further, in the common work space server 13, according to the above detected object context change event, information of the newly added activity event is registered in "the activity event reference" 53 as an element of "the activity event reference" set of "the collaborative activity context" 52 saved by the common work space server 13.

When a change in the object such as an addition of a new object to the common work space is detected, the activity context described later is changed over.

"Processing of Sending Activity Event Registration Message to all Objects Under the Same Context"

In order to send the activity event registration message generated above to all objects existing in the work space α as shown in FIG. 11, the common work space server 13, according to the object context change event detected as described above (step S110), sends the activity event registration message 101 (steps S111, S112), which is generated after the registration at "the collaborative activity context" 52, to the activity history server URL saved by "all the collaborative activity object" 92 registered in "collaborative activity object set" 91, as POT message (step S113).

For example, as shown by reference numeral 121 in FIG. 12, when a fluctuation of the user in the common work space is detected by the detection server 5 and the detection message is sent, the common work space server 13 in the common work space concerned sends the activity event registration message to all the individual activity history server 2. In this connection, in the case of an object fluctuation in the common work space detected not via the detection server 5 like the fluctuation of the common document, as shown in FIG. 12, the activity event registration message is sent to all the individual activity history server 2 in which the common work space server 13 of the common work space concerned is registered.

In the processing of sending the above activity event registration message, the address of the activity history server corresponding to the individual object is identified by ID information given to each object. In this connection, the object ID includes information of the type of the object (persons, devices, electronic documents, images and so forth) and the identifier of the object. Further, the identifier of the object includes a row of letters capable of being captured on the address of the server, which saves the activity history of the object concerned, and on the file name.

"Processing in Individual Activity History Server Receiving Activity Event Registration Message"

As shown in FIG. 13, in the individual activity history server 2, the profile object corresponding to users and various document objects are saved as "the element object" 131 of "the object set" 134. "The object" 131 saves URL to specify the object, the object type representing the type of the object (users, documents and so forth), URL representing a place where the actual bodies of the object and document are represented, the set of "the object activity event" 132 representing the history of the object, and the set of "the object activity event reference" 133 as the history of the other object used in the same context.

The individual activity history server 2 saves and controls information of the collaborative work that the user participates as an activity event. The individual activity history server 2 also saves and controls information of the other object that the user participated as "an object activity event reference".

As shown in FIG. 14, the individual activity history server 2 waits for the activity event registration message at all times (step S140). When the activity event registration message is received, according to ID of the object included in the activity event registration message received, the object is retrieved from "the object set" 131 and specified (step S141).

In the case where ID of the object agrees, "the object activity event" 132 of "the object" 131 is newly generated and registered according to information of the time and place included in the registration message of the activity event (step S142).

On the other hand, in the case where ID of the object does not agree, "the object activity event reference" 133 of the object is newly generated and registered according to information of the time and place included in the registration message of the activity event (step S143).

The individual activity history server 2 conducts processing to renew "the object activity event" 132 with respect to the activity event about the user controlled by the individual activity history server. The individual activity history server 2 conducts processing to renew "the object activity event reference" 133 about the activity event, in which the user controlled by the individual activity history server 2 is involved, with respect to the other user.

"An Overview of Activity Contexts"

Figures 15, 16:
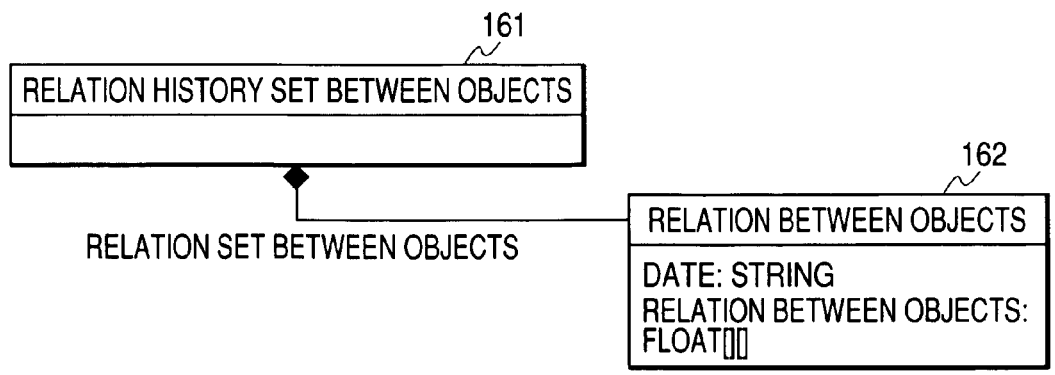
FIG. 15 is a view for explaining a relation matrix between objects of an embodiment of the present invention.
FIG. 16 is a view for explaining history data between objects of an embodiment of the present invention.

The computer 15 for displaying an overview periodically makes access to the object event set 131 saved by the individual activity history server 2 and acquires a set of "the object activity event" 132 and a set of "the object activity event reference" 133. For example, as shown in FIG. 15, the calculation processing function for generating the relation matrix 151 between the objects and the function for executing the processing to display the overview relation between the objects according to the relation matrix between the objects are provided as Java applet (registered trademark).

The relation matrix 151 between the objects represents an intensity of the relation between the objects and is calculated as follows.

A set of "the object activity event" 132 with respect to the object saved by the set of "the object" 41 of the user (object) who uses the computer 15 for displaying an overview and a set of "the object activity event reference" 133 accumulated according to the collaborative work, in which the user participates, are acquired, and an intensity is calculated according to the frequency of the cases in which the object groups are utilized in the same context.

For example, the intensity Sij between two objects i and j, which were utilized in the same work space in the past, is expressed by a sum of the logarithm of the time tij that has passed from when both objects (users, documents, application programs and so forth) started existing in the scene of a collaborative work. As shown by the following formula, in the matrix between the objects, values are used which are acquired when they are normalized while the maximum value is set at 1.0.

$$Sij = \Sigma \log tij$$

In this connection, in the case of acquiring a set of "the above object activity event reference" 133, while "the object activity event reference" saved by the object corresponding to "the object activity event reference" 133 is being traced to a predetermined depth (the number of steps of link), the activity history of each object is picked up from the server saving the activity history. An intensity of the relation between the objects at the point of time when each context has started is calculated. As shown in FIG. 16, the relation matrix 15 between the objects, which is a result of the calculation, is registered and saved in the computer 15 for displaying an overview of each user as "the relation between the objects" 162 of "the relation history set between the objects" 161.

According to the intensity of the relation between the objects saved in "the above relation history set between the objects" 161, in the computer 15 for displaying an overview of each user, an interface for displaying an overview of the activity history with respect to the relation between the objects is generated. This interface for displaying an overview of the activity history is displayed on the image plane of the computer 15 in the manner shown, for example, in FIGS. 17 and 18.

Figure 17:
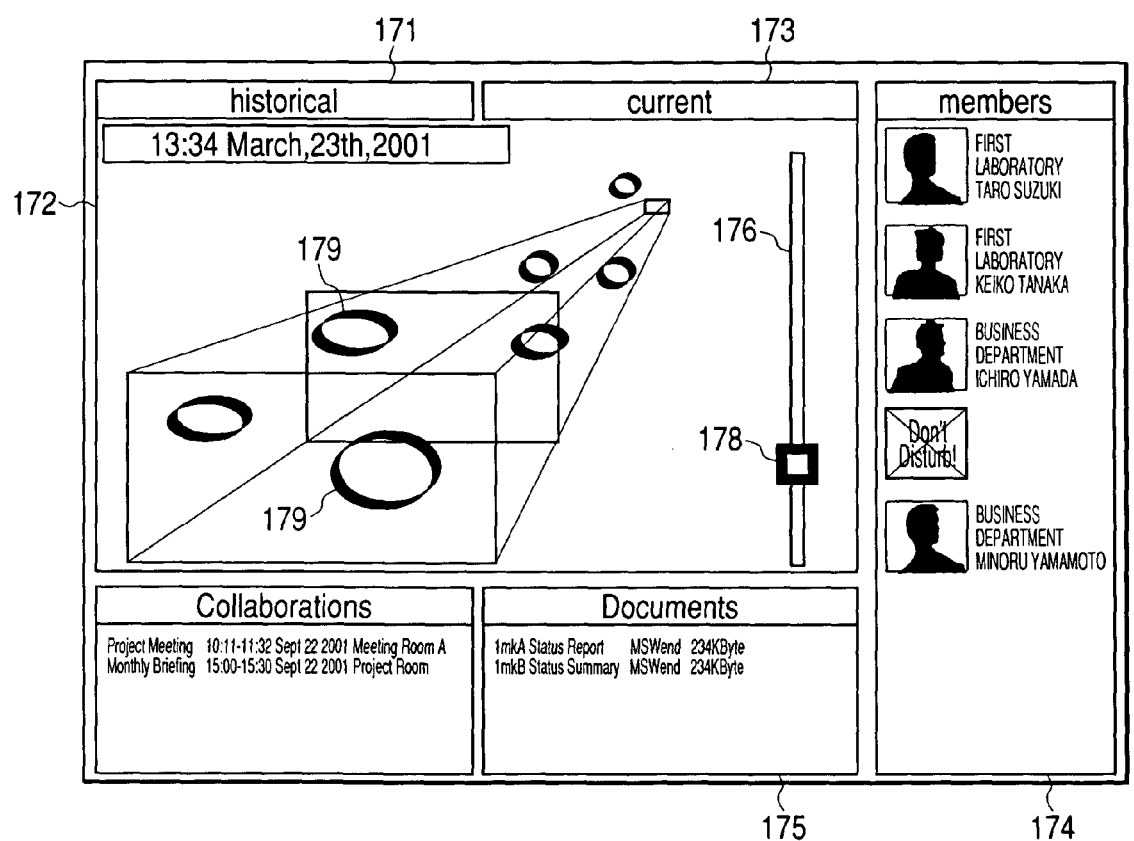
FIG. 17 is a view for showing an example of displaying an image plane of an embodiment of the present invention.
Figure 18:
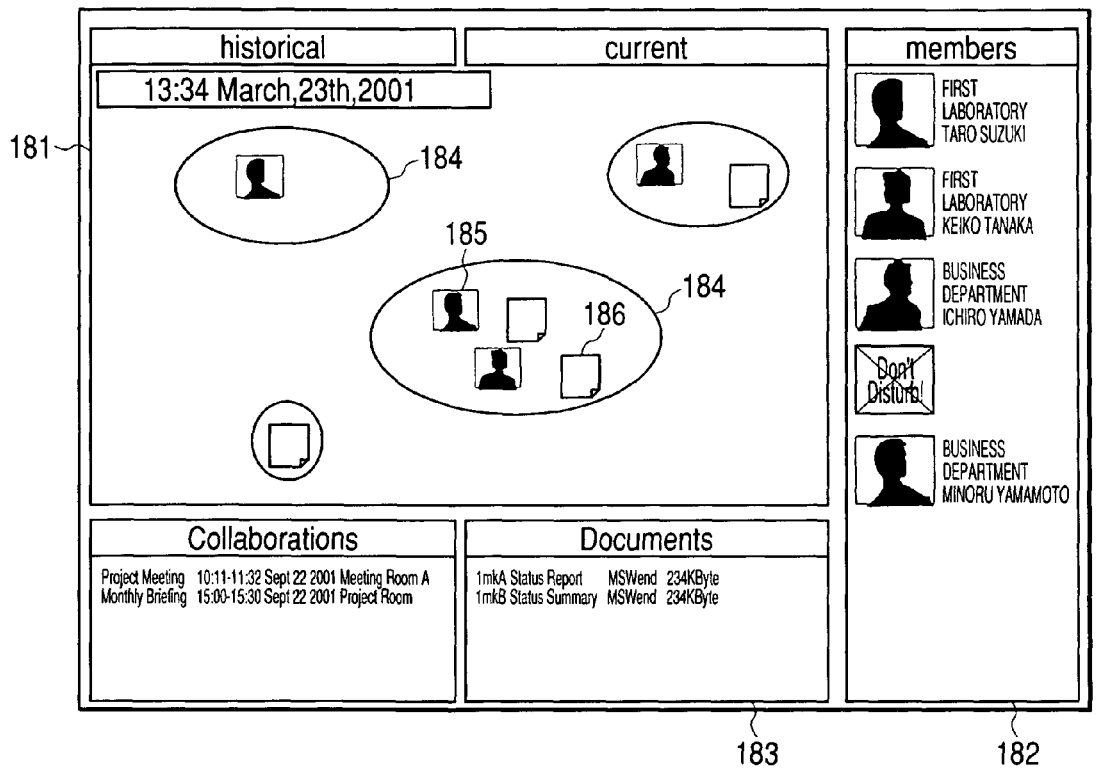
FIG. 18 is a view for showing an example of displaying an image plane of an embodiment of the present invention.

First, on the interface image plane shown in FIG. 17, when "historical" button 171 is pressed, the context history overview 172 to display a relation between the activity events in a time series is displayed. When "current" button 173 is pressed, as shown in FIG. 18, the current context overview 181 showing a relation between the present objects is displayed.

Further, the interfaces for displaying an overview of the activity history respectively display the user lists 174, 182, the document lists 175, 183 and so forth for each project. Further, in the context history overview 172 displaying the relation between the objects in a time series, the slider bar 176 for indicating an arbitrary point of time in the past is provided. When the arbitrary point of time in the past is indicated by moving this slider indicator 178 on this slider bar, it is possible to display the list of users and documents.

In this connection, in FIG. 17, reference numeral 179 is a collaborative work (activity event). In FIG. 17, several activity events are displayed from the distant side of the viewer to the close side of the viewer in a time series. In FIG. 18, reference numeral 184 is an activity event, several activity events are displayed in a time series. Reference numeral 185 is an icon showing a user participating in the activity event. Reference numeral 186 is an icon showing a document used in the activity event. As shown in FIG. 5, a positional relation between these object icons 185, 186 is determined in such a manner that the objects, the degree of the relation between the objects of which is high, are located close to each other.

When the icon regions of the user and document, which are displayed in the context history overview 172 of the interface for displaying an overview and also displayed in the current context overview 181, are clicked with a mouse, an operation event for notifying that the icon has been clicked is generated. According to the event, the user object or the document object concerned is picked up, and the content of the object concerned can be displayed via the user interface as shown in FIG. 19.

Figure 20:
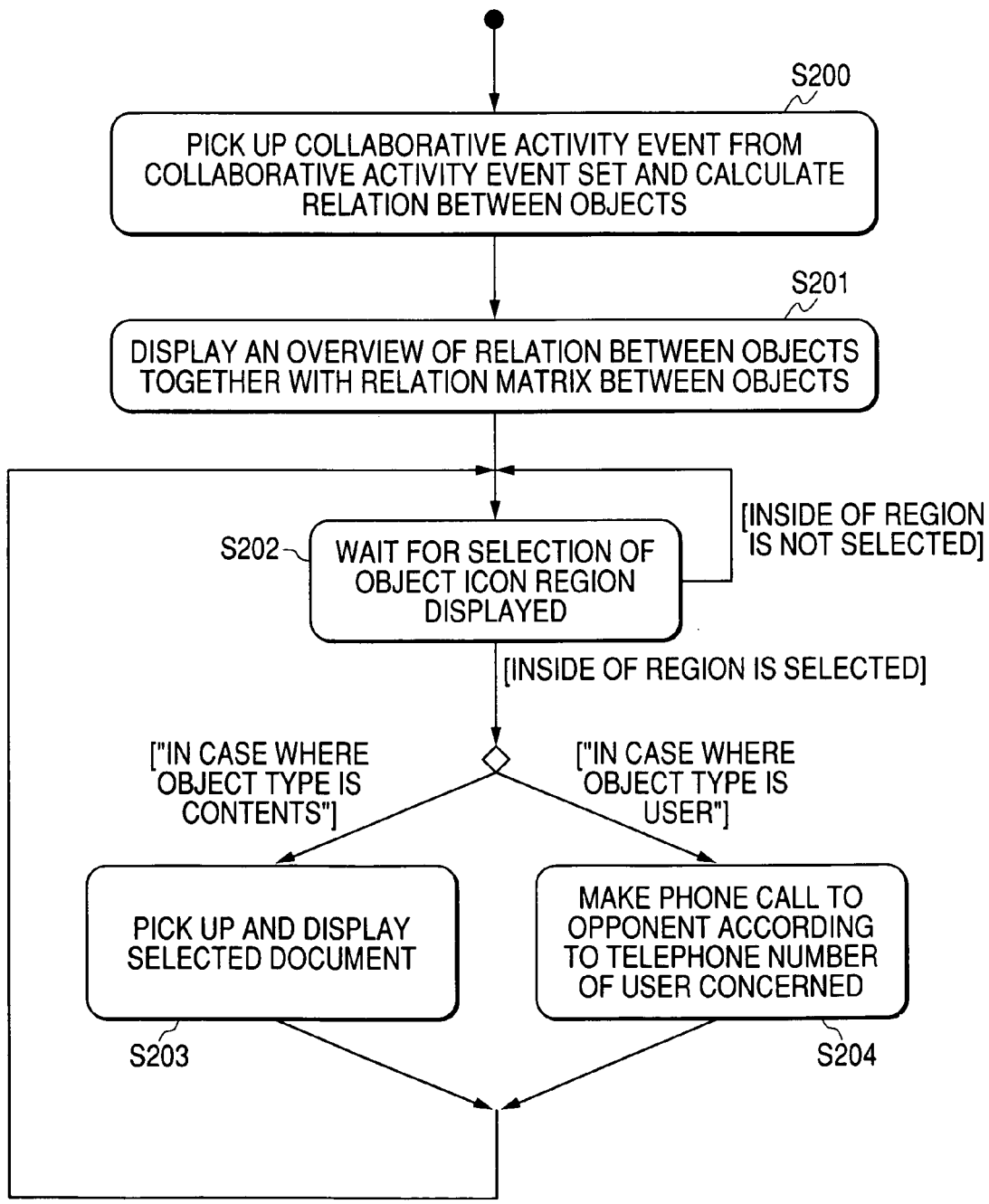
FIG. 20 is a view for explaining processing for displaying an overview of a relation between objects of an embodiment of the present invention.

As shown in FIG. 20, processing of display of an overview of the relation between the objects is conducted by the computer 15 for displaying an overview as follows. The collaborative activity event 52 is picked up, and an object relating to each activity event is specified. Then, a relation between these objects is calculated (step S200), and an overview relation between the objects with respect to the collaborative activity events is displayed on the image plane according to the relation matrix between the objects (step S201). When the user icon 185 or the document icon 186, which is displayed an overview, is selected by the user's operation (step S202), in the case of the document icon, the actual data of the selected document is acquired from the memory file concerned and displayed on the image plane (step S203). In the case of the user icon, the selected profile data of the user is acquired from the memory file concerned and displayed on the image plane (step S204).

When an object icon is selected on the interface for displaying an overview, an address of the activity history server 2 of the object and object ID are picked up, and an access request message is sent to the activity history server 2, and a content accommodated in the actual address URL saved by "the object" 131 corresponding to the object ID is picked up and displayed on an image plane provided for the computer 15 for displaying an overview.

In this connection, in this embodiment, a list of the telephone numbers of the users are stored in the computer 15 for displaying an overview. In the case where an icon is selected by a user, according to the telephone number of the user, the computer 15 for displaying an overview makes a phone call via the network 1 (step S204). Due to the foregoing, according to an overview of the collaborative activity history displayed, it is possible to hold a communication with the other user easily.

"Changeover of Collaborative Work Context"

Figure 21:
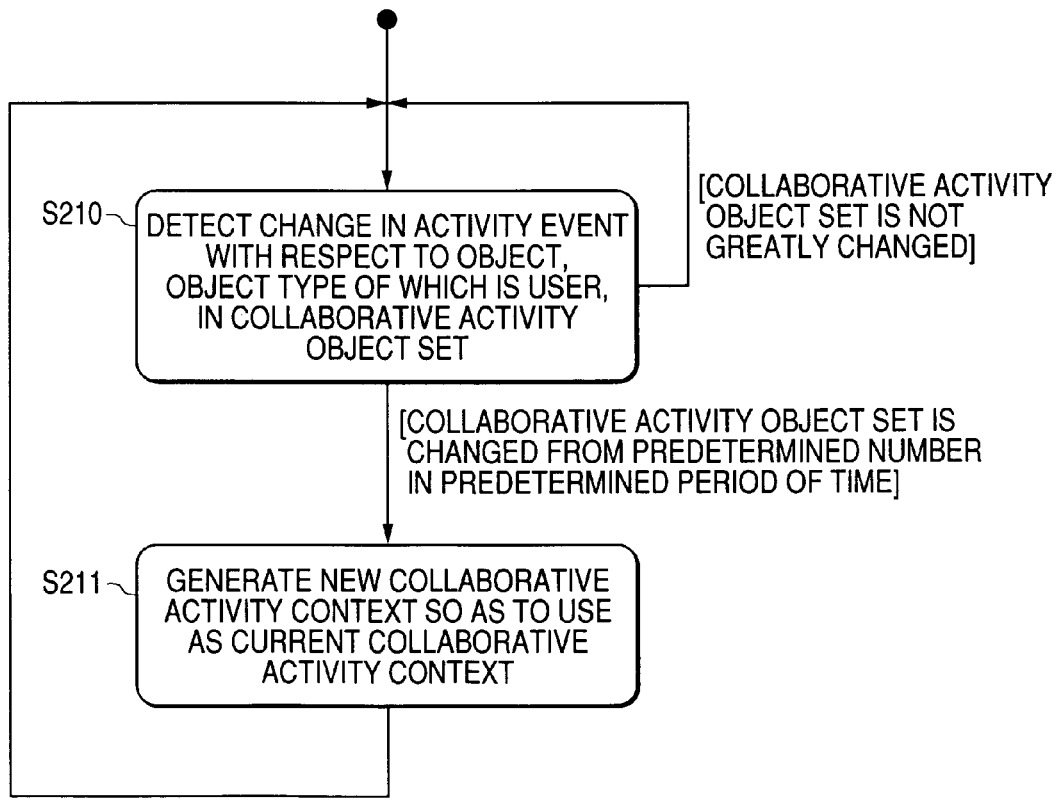
FIG. 21 is a view for explaining processing of generation of a collaborative activity context of an embodiment of the present invention.

By the processing shown in FIG. 21, the collaborative work space server 13 changes over the collaborative work context as follows.

When the activity event reference, which is registered in a set of "the activity event reference" 53 saved by "the collaborative activity context" 52 of the collaborative work space server 13, is registered or erased, the collaborative work space server 13 inspects whether or not "the activity event reference" 53 with respect to the object, the object type of which is a user, is changed by not less than a predetermined ratio in a predetermined period of time (step S210).

When it is detected that "the activity event reference" has been changed by not less than a predetermined ratio, it is recognized that a scene of the collaborative work has changed. In the case where f, which is given by f=n/T, exceeds a predetermined value wherein T is a unit time and n is a number of the objects registered or erased, it is recognized that the scene of the collaborative work has finished and a scene of a new collaborative work has started.

The ending time of the collaborative activity context 52 of "the current context" 56 saving the present context is set at the present time, and the state is set at "end" and a new collaborative activity context 52 is generated. The starting time is set at the present time, and the state is set at "execution". The generated collaborative activity context 52 is made to be the current collaborative activity context and set at "the current context" 56 (step S211).

At the same time, the collaborative work object set 91 corresponding to the context concerned is generated at the same time.

On the other hand, when the contexts change and the context of the current is finished, the collaborative activity context and the collaborative work object set are cleared.

"Start of Processing According to Detected Contexts"

Figure 22:
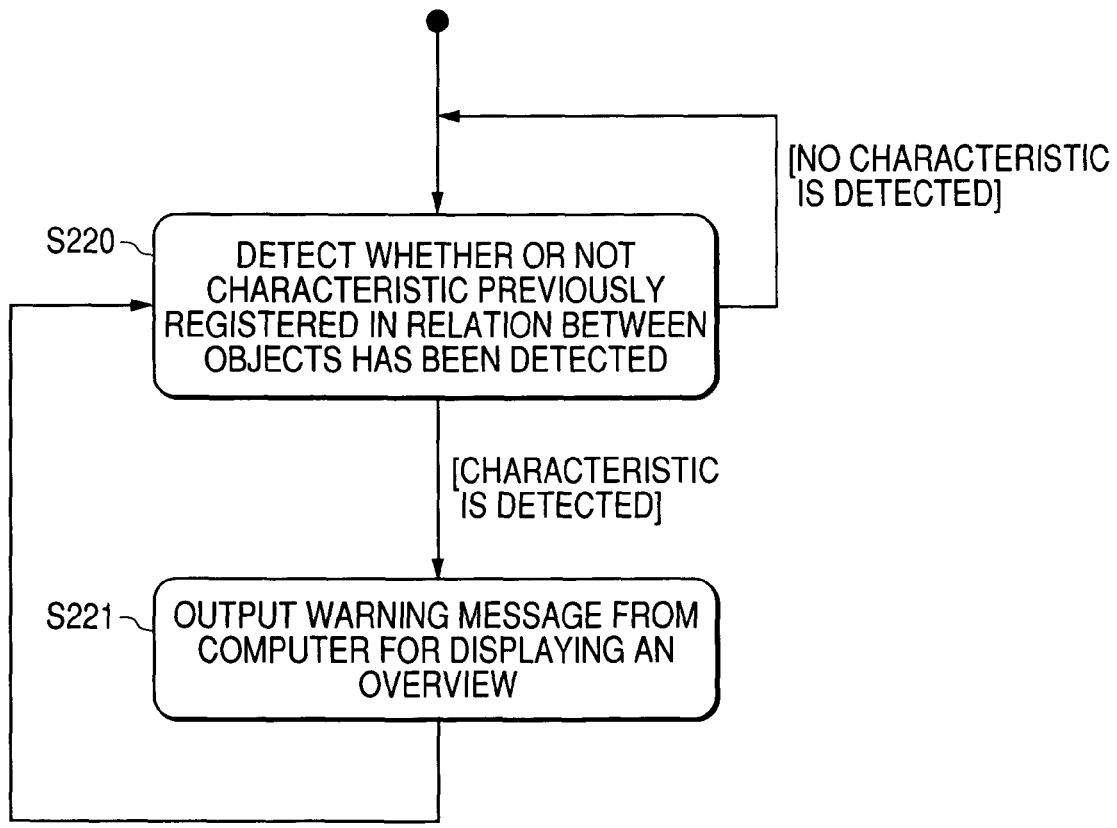
FIG. 22 is a view for explaining processing of awareness of activity contexts of an embodiment of the present invention.

When a new activity event reference is registered in or erased from the set of "activity event reference" 53 of "the collaborative activity context" 52 saved by the common work space server 13, as shown in FIG. 22, the activity event reference registered in the activity event reference set is checked up by the collaborative activity space server 13 (step S220). In the case where a typical context previously registered, in which the other participants having an intensity not less than a threshold value on the relation matrix between the objects gather at a specific place, is detected, a warning message to warn the contexts is sent to the user P, who is detected in the work space a concerned, and the computer 15 for displaying an overview can display the warning message (step S221).

Due to the foregoing, each user engaging in a certain collaborative work can recognize that the contexts have changed. Accordingly, the users can hold a good communication with each other.

As described above, according to the system of the present invention, in a working environment in which a plurality of users are engaged in business while moving in various places in an office, the history of a collaborative work can be recorded without being aware of a change in members composing a working group and extinction of the group. Further, it is possible to refer to the contents and activity process utilized in a past activity with respect to the collaborative work recorded and also utilized in another activity. Furthermore, the activity itself utilizing the knowledge can be also utilized in another activity.

It is possible for members working in different places to grasp the mutual working contexts such as working places and documents which are being used. Further, it is possible for the members to engage in business while they are having a sense of togetherness. Furthermore, by utilizing an overview of the contexts displayed so that the contexts can be intuitively grasped, it is possible to quickly make access to the contents utilized in the past and the users who worked together so as to hold communication. Furthermore, from the activity contexts of the other members, for example, it is possible to know that they are gathering at a conference. Due to the foregoing, it is possible to call their remembrance about the schedule so that the function as a reminder can be provided. Furthermore, when the activity contexts of the other members are known, it is possible to know the existence of the other members who are acting with the same interest and critical concern. Therefore, it is possible to facilitate forming a new activity community among these members.

According to the present invention, the activity history in the actual working environment can be recorded according to the actual working contexts, and the activity history can be displayed and provided for users so that it can be used again.

What is claimed is:

1. A work space control apparatus for controlling activities conducted by objects in a work space as history, the apparatus comprising:

a detection device that detects an activity event conducted by each object in the work space including a single non-simulated real space;

an activity event control device that saves the activity event detected while relating the activity event detected to time for each object during which each object conducts the detected activity event and a non-simulated real place for each object where each object conducts the detected activity event; and a display device that displays the saved activity event by displaying a symbol representing each object conducting the saved activity event;

wherein the objects in the work space include a person in at least the single non-simulated real space, the detection device at least detects an activity that is conducted by two or more objects in the single non-simulated real space, and the display device displays the symbols in accordance with a relation table representing an intensity of a relation between any pair of objects so that a distance, on the display device, between any pair of symbols displayed that represent a respective pair of objects conducting their respective saved activity event corresponds to a degree of relation between the pair of objects.

2. The work space control apparatus according to claim 1, further comprising:

an actual body acquiring device that acquires non-simulated actual body information of at least one of the objects of the activity according to the activity event saved by the activity event control device.

3. The work space control apparatus according to claim 2, further comprising:

an object access device that starts a predetermined processing motion responding to that the actual body acquiring device has made access to actual body information of an object.

4. The work space control apparatus according to claim 1, wherein the activity event control device saves the detected activity event conducted by each object together with information of the time during which each object conducts the detected activity event so that the detected activity event can be referred from an other object.

5. The work space control apparatus according to claim 1, further comprising:

a capture input device that photographs captured data of the activity conducted in the work space, wherein the activity event control device controls the captured data corresponding to the activity event so as to supply captured data as a display output corresponding to the activity event.

6. The work space control apparatus according to claim 1, wherein the detection device detects a change in a set of user objects corresponding to the activity event, and the activity event control device saves an activity as a different activity event each time the change is detected.

7. The work space control apparatus according to claim 1, further comprising:

a warning device that outputs a warning to a user when a predetermined state is detected by the detection device.

8. The work space control apparatus according to claim 1, wherein the objects include a document used in the work space.

9. The work space control apparatus according to claim 1, wherein selecting a symbol representing the object on the display causes a document representing the object to be displayed on the display.

10. A work space control apparatus for controlling activities conducted by objects in a work space as history, the apparatus comprising:
   a detection device that detects an activity event conducted by each object in the work space including a single non-simulated real space;
   an activity event control device that saves the detected activity event, which is conducted by each object, in association with each object and saves a link to another object that conducts the detected activity event together, in association with each object; and
   a display device that specifies objects conducting each saved activity event and displays a symbol representing each activity event and symbols representing the specified objects which conduct each activity event,
   wherein the objects in the work space include a person in at least the single non-simulated real space,
   the detection device at least detects an activity that is conducted by two or more objects in the single non-simulated real space, and
   the display device displays the symbols in accordance with a relation table representing an intensity of a relation between any pair of objects so that a distance, on the display device, between any pair of symbols displayed that represent a respective pair of objects which conduct their respective activity event, corresponds to a degree of relation between the pair of objects.

11. A work space control system comprising:
   a detection device that detects an activity event conducted by an object in each work space including a single non-simulated real space;
   a work space history saving device that saves the detected activity event for each work space of the activity event;
   an object history saving device that, upon detection of the activity event, saves the detected activity event for each object conducting the detected activity event and saves a link to another object that conducts the detected activity event together, in association with each object; and
   a display device that specifies objects conducting the respective saved activity events, and displays a symbol representing each activity event and symbols representing the specified objects which conduct each activity event,
   wherein the objects in the work space include a person in at least the single non-simulated real space,
   the detection device at least detects an activity that is conducted by two or more objects in the single non-simulated real space, and
   the display device displays the symbols in accordance with a relation table representing an intensity of a relation between any pair of objects so that a distance, on the display device, between any pair of symbols displayed that represent a respective pair of objects which conduct activity event, corresponds to a degree of relation between the pair of objects.

12. The work space control system according to claim 11, wherein the display device displays the symbols representing the specified objects in positions according to a degree of relation between the specified objects.

13. An activity event display apparatus for displaying and outputting history of activities conducted by objects in a work space, the apparatus comprising:
   an acquiring device that acquires information of activity events of one object from a memory, which saves the activity events conducted by respective objects in the work space including at least one non-simulated real space and saves links to the respective objects conducting respective activity events; and
   a display device that specifies objects conducting the respective saved activity events, and displays a symbol representing the respective activity events and symbols representing the specified objects which conduct the respective activity events,
   wherein the objects in the work space include a person in the at least one non-simulated real space, and
   the display device displays the symbols in accordance with a relation table representing an intensity of a relation between any pair of objects so that a distance, on the display device, between any pair of symbols displayed that represent a respective pair of objects which conduct the respective activity events, corresponds to a degree of relation between the pair of objects.

14. A method of controlling activities conducted by objects in a work space as history, the method comprising:
   detecting an activity event conducted by each object in the work space including a single non-simulated real space;
   saving the detected activity event while relating the detected activity event to time for each object during which each object conducts the detected activity event and a real place for each object where each object conducts the detected activity event; and
   displaying the saved activity event by displaying a symbol representing each object conducting the saved activity event,
   wherein the objects in the work space include a person in the single non-simulated real space,
   an activity is detected that is conducted by two or more objects in the single non-simulated real space, and
   the display device displays the symbols in accordance with a relation table representing an intensity of a relation between any pair of objects so that a distance, between any pair of symbols displayed that represent a respective pair of objects conducting their respective saved activity event corresponds to a degree of relation between the pair of objects.

15. A method of controlling activities conducted by objects in a work space as history, the method comprising:
   detecting an activity event conducted by each object in the work space including a single non-simulated real space;
   saving the detected activity event, which is conducted by each object, in association with each object and saving a link to another object that conducts the detected activity event together, in association with each object;
   specifying objects conducting respective saved activity events; and
   displaying on a display device, a symbol representing each activity event and symbols representing the specified objects which conduct each activity event,
   wherein the objects in the work space include a person in the single non-simulated real space,
   an activity is detected that is conducted by two or more objects in the single non-simulated real space, and
   the display device displays the symbols in accordance with a relation table representing an intensity of a relation between any pair of objects so that a distance, on the display device, between any pair of symbols displayed that represent a respective pair of objects which conduct their respective activity event, corresponds to a degree of relation between the pair of objects.

16. A method of controlling activities conducted by objects in a work space as history, the method comprising:

detecting an activity event conducted by each object in the work space including a single non-simulated real space;

saving the detected activity event conducted by each object together with activity time information of the activity event;

saving a link to another object that conducts the detected activity event in association with each object conducting the detected activity event; and displaying on a display device, symbols representing a plurality of the saved activity events of one object from a distant side of a viewer to a close side of the viewer in a time series manner, wherein an activity is detected that is conducted by two or more objects in the single non-simulated real space.

17. The method according to claim 16, wherein a distance, on the display device, between any pair of symbols displayed that represent a respective pair of objects which conduct their respective event, corresponds to a degree of relation between the pair of objects.

* * * * *